Oct. 29, 1946.  E. F. MARTINEC  2,410,094
GAUGING DEVICE
Filed March 17, 1943  2 Sheets-Sheet 1

Inventor
Eugene F. Martinec
By Wooster & Davis
Attorneys

Oct. 29, 1946.   E. F. MARTINEC   2,410,094
GAUGING DEVICE
Filed March 17, 1943   2 Sheets-Sheet 2

Inventor
Eugene F. Martinec
Wooster & Davis
Attorneys

Patented Oct. 29, 1946

2,410,094

UNITED STATES PATENT OFFICE 2,410,094

GAUGING DEVICE

Eugene F. Martinec, Cleveland, Ohio

Application March 17, 1943, Serial No. 479,430

10 Claims. (Cl. 33—147)

This invention relates to gauging devices, and has for an object to provide a simple and effective device for very accurately gauging various parts or elements, and one which can be employed to operate an indicating means, either visible, audible, element sorting or separating, and the like.

This invention relates not only to a gauging instrument which may be used for indicating and controlling tolerances, that is, indicating when elements being gauged are within given tolerances, or separating them so that elements within given tolerances are placed together and separated from those outside these tolerances; but may also be used as a sorting control so that elements of the same size can be separated and placed together.

It is also an object to provide such a device which may be constructed and assembled as a unit, to be assembled and adjusted independently of its application, and may be mounted as such a unit on an application locating support in position for gauging the desired parts or elements involved, and at the same time may be used in connection with the device with which it is so located to control operation of the device on the elements to be gauged to maintain them accurately within predetermined small limits.

Another object is to provide a device comprising a complete assembled unit which may be located and used as such, and includes a light-sensitive element with means connected therewith for connecting it with indicating means to be controlled, a light element to provide a light beam to the light-sensitive element, a movable means positioned to be affected by the element to be gauged, and means located between the light element and the cell element to control the light beam to the cell element including a movable member operated by said movable means to be positioned in accordance with dimensions of the element to be gauged.

Another object is to provide a device in which it is possible to vary the tolerances desired without in any way disassembling the gauge unit.

Still another object is to provide a gauging unit that will not only automatically gauge parts to within .0001 inch or less, but may also be employed to automatically grade them or sort them into receptacles according to size.

A particular object is to provide a gauging means which will not only automatically gauge the elements within close limits, but in which the errors due to the human element in reading a gauge and depending on such readings are eliminated.

With the foregoing and other objects in view I have devised the construction illustrated in the accompanying drawings forming a part of this specification. It is, however, to be understood the invention is not limited to the specific construction and arrangement shown but may employ various changes and modifications within the scope of the invention. These drawings are somewhat diagrammatical, but show the device in sufficient detail so that the principles of construction and operation may be readily understood.

Figure 1:
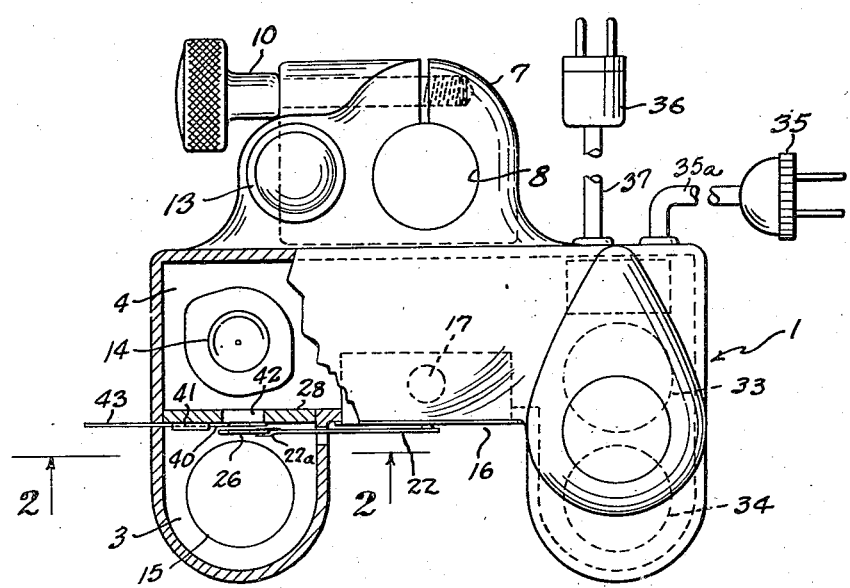
Fig. 1 is a top plan view and partial section showing one form of the device.

This invention was developed for the purpose of filling a definite need on the part of industry for gauging equipment capable of not only automatically gauging parts or elements to within .0001 inch or less, but which also could be used to automatically grade them and sort them into bins or receptacles according to size. Gauges now largely employed are dependent upon the human element to correctly read the gauge, and then depend on the operator to sort the articles according to such readings in the correct receptacle. The ordinary dial type of gauge is rather difficult to read and becomes extremely tiresome to the operator where a large number of pieces are handled, resulting in liability to error, which tendency increases as the number of pieces handled is increased. In an attempt to remedy this condition several so-called electro-limit gauges and other types of electric gauges have been developed which spread the indication of size over a much larger dial area so as to make them easier for the operator to read. All the electric gauges are extremely critical devices and require considerable setting and maintaining of adjustment and in addition are quite expensive and complicated. In spite of the larger dial area for any given tolerance provided by these electric type gauges, they are still subject to the human element in correctly reading and sorting the pieces.

To overcome these difficulties and problems, I have devised the present construction which will not only automatically register extremely small tolerances, but may also be employed to sort the measured piece into its correct receptacle. In this invention the extremely simple gear type dial gauge, which over a good many years has proved to be extremely durable and accurate, is employed, and there is built around it and assembled therewith in a complete unit, means of translating the reading given by the dial gauge into any amount of energy necessary for correctly indicating the reading or doing any type of feeding, grading, sorting, feed or adjustment control and the like. This has been accomplished without in any way affecting the accuracy, life or simplicity of the dial gauge.

This new device makes use basically of the indicator hand of the dial gauge for interrupting in various ways a beam of light focused on a photocell element which may be used directly or associated with an extremely stable, simple and economical amplifier. No special equipment in the form of special vacuum tubes, relays or other similar equipment is necessary, as standard devices readily available on the market may be employed. As a beam of light offers absolutely no resistance to the passage of a solid through it, it will be understood that this system or device in no way affects the stability and accuracy of the simple dial gauge. The device is so constructed and arranged that no special optical system is required and a standard small type lamp developed for projector use may be employed. All vacuum tubes and relays used may be of standard types produced in large quantities for other purpose and therefore may be readily secured on the market.

Referring first to Figs. 1, 2, 3 and 6, the device comprises a small and compact housing 1 made of suitable material, preferably a suitable molded plastic material or a die-casting, and may for convenience and simplicity of molding comprise two or more sections secured together, as for example in the present case a body portion 2 having suitable chambers 3, 4 and 5 in which are mounted various elements of the device, and some or all of which may open through one side of the housing, as for example the top thereof to facilitate mounting the elements in these chambers, and which chambers may be closed by a suitable top or closure section 6. The housin also includes a split lateral extension or frame 7 having an opening 8 therethrough to receive and embrace an application locating post or support 9 and on which it is adjustable to permit location in the proper desired position and on which it may be clamped in adjusted position by a clamping screw 10. There is also provided a locking collar 11 also embracing the post or support 9 and split so that it may be clamped in the desired position on this post or support by a similar clamping screw 12. Frame portion 7 is connected to this collar by a micrometer adjusting screw 13 mounted for turning movements in the collar and having threaded connection with the housing frame 7. This may be a single or double micrometer screw as desired, and is designed for close micrometer adjustments between the collar and the housing to properly locate the housing and the gauging means carried thereby with respect to the gauging table or support indicated diagrammatically at G, and permit locating of the device in zero position in respect to its master or standard element 18 with which the elements to be gauged are to be compared, as will be more fully described later. The collar 11 may be clamped in desired position on the post or support 9, and, after loosening the clamping screw 10, the housing may be raised or lowered by the micrometer screw 13 to the desired position and then clamped in this position by again tightening or setting the screw 10.

Figure 6:
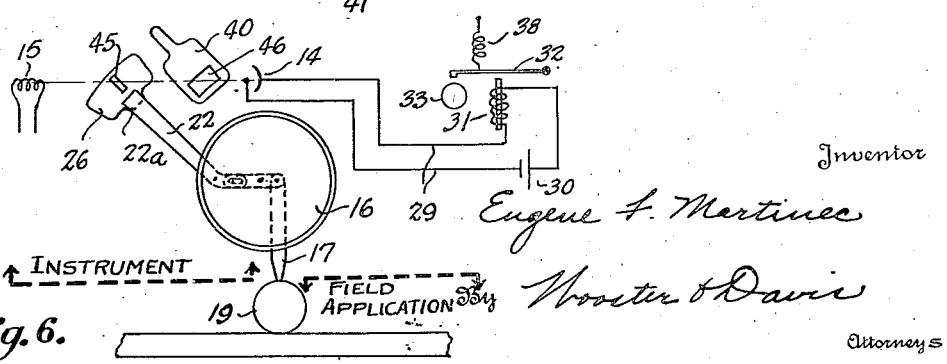
Fig. 6 is a diagrammatical view showing one application of the device and its relation to the article to be gauged.

Mounted in the housing, as for example in the chamber 4, is a light-sensitive or photocell element 14, and in the adjacent chamber 3 is a light source such as a relatively small filament incandescent electric light element 15 to provide a beam of light to be projected on the cell element 14. Located between the light element and the cell element is means for controlling the light beam which means is in turn controlled by a means responsive to variations in the dimensions of the elements to be gauged. For this purpose, although various types of gauging or measuring mechanism may be used, I prefer a typical gear type dial gauge 16 which has over a good many years of use proven to be extremely durable and accurate. A satisfactory type of this mechanical gauging element is illustrated somewhat diagrammatically and comprises a movable stem 17 guided for vertical sliding movement and projecting from the housing in position to engage the element to be gauged, such as the master gauge block 18 used for setting the device, and the elements to be gauged, such as the circular element 19 (Fig. 6). It will be understood this stem need not directly engage the element being gauged, but could engage an intervening member whose position is determined by the element so that the position of the stem is determined by this element. An example of such an arrangement is disclosed in my copending application filed March 15, 1943, Serial No. 479,243, and designated Case F. This movable stem 17 is connected by a rack 20 and suitable gearing 21 with an indicating arm 22, the gearing being such as to step up or amplify the movement of stem 17 to give a much larger movement of the indicating arm. This arm may move over a suitable indicating dial 23 and have a zero setting slot 24 or other indicating means to indicate when it is in zero position over the dial. A spring 25 tends to shift the stem 17 downward to engage the article being gauged.

The arm is extended to a position between the photocell element and the light element and is provided with means 26 so positioned that during the measuring operation it cooperates with an opening or slot 46 on a wall 29 located between the cell element and the light element for passage of a light beam from the light element to the cell element, and at the proper time, depending on the size, shape and other characteristic of the member 26 on the indicating arm and the location of this arm, to interrupt the light beam to the cell element and therefore cause operation of this element to control some device, such for example as an indicating device, as either visible or audible indicating means or a suitable sorting mechanism for the elements being gauged. The term "indicating means" is used in the broad sense as meaning any one of a number of different devices, such for example as a visible indicator, an audible signal, sorting means, adjusting means and so forth, or any device affected or controlled by the reaction of a cell due to interruption or change of the light beam.

In the diagrammatical view, as shown in Fig. 6, the cell 14 is shown as connected by a suitable wiring 29 with a suitable source of current, as a battery 30 and coil 31 operating the clapper 32 of a signal bell 33. This particular indicator is shown merely by way of example to indicate some device controlled by the cell. The mechanical gauging element 16 is also shown diagrammatically, and instead of showing the gear train connection between the stem 17 and the gauging arm 22, a merely conventional connection is shown to indicate that movement of the stem 17 upwardly swings the free end of the arm 22 upwardly or clockwise.

Various shapes and sizes of elements 26 may be carried by the indicating arm to cooperate with the slot 46 to control the light beam, depending on tolerances and other effects desired, it being preferred that these elements be detachably mounted in the arm 22 so that they may be changed to secure the effect desired. In the present case by way of example, two different shapes and sizes of this element are shown, indicated by the numerals 26 and 26a, these being shown as thin plates slipped into the forked end 22a of the indicator arm, the sides of which may be spring elements frictionally gripping and holding the removable element. The audible signal 33 may also be mounted in the housing as indicated, and if relays or other operating mechanism are desired as well as amplifying tubes and devices for amplifying the current from the cell element, they may also be mounted in the housing, as indicated diagrammatically at 34, making a self-contained gauging unit which may be assembled and adjusted independently and separately from its position of use, and then it may be mounted at the position of use on a suitable support, such as for example the application locating post or support 9 on a gauging or sorting device, or on a machine tool where the device is to be used for adjusting the operating tools, such for example as a grinding wheel to control grinding of a series of articles within close tolerances and adjust the grinding operation for variations in the wheel as it wears, for example. Thus as shown in Fig. 1 there may be an attachment cap 35 for plugging the device into a source of electric power, as for example the outlet from a house wiring system, and another plug 36 connected by a flexible cable extension 37 from this device to connect it with a field application, such as an indicating device, including a sorting, adjusting or similar field application as indicated above.

As above indicated the arm 22 is so positioned that during the measuring operation it may pass between the light source 15 and the light-sensitive element 14, particularly through a light beam passing through the slot or opening 46 from the light source to the cell element. The completed unit is so constructed physically that the only light that can reach the cell element is through this slot, and although the indicator arm with its element 26 is shown mounted between the source and the slot 46, the same effect would be secured if it were mounted between the slot and the cell element, it being required only that it be positioned to interrupt the light beam at a given location or locations.

As indicated, from the broad and fundamental operation of the unit, it will be understood that if the indicating arm 22 (specifically the element 26 or 26a) during measurement of an element 19 (Fig. 6) being gauged should be so positioned that the slot in element 26 or 26a should line up with opening 46 (or any other opening in any type of templet being used) light will then shine on the photocell 14 thereby lowering its resistance to the point where the battery 30 will force sufficient current through the coil 31 of the signal device so that the clapper 32 will be pulled down toward coil 31 striking the bell 33. When the light is again cut off because the indicating arm 22 assumes some position where the slots do not line up the light will be cut off from the photocell, thereby increasing its resistance to the point where sufficient current does not flow through the coil 31 to hold the clapper 32 in its down position, at which time the biasing spring 38 will pull the clapper upward away from bell 33.

Figure 2:
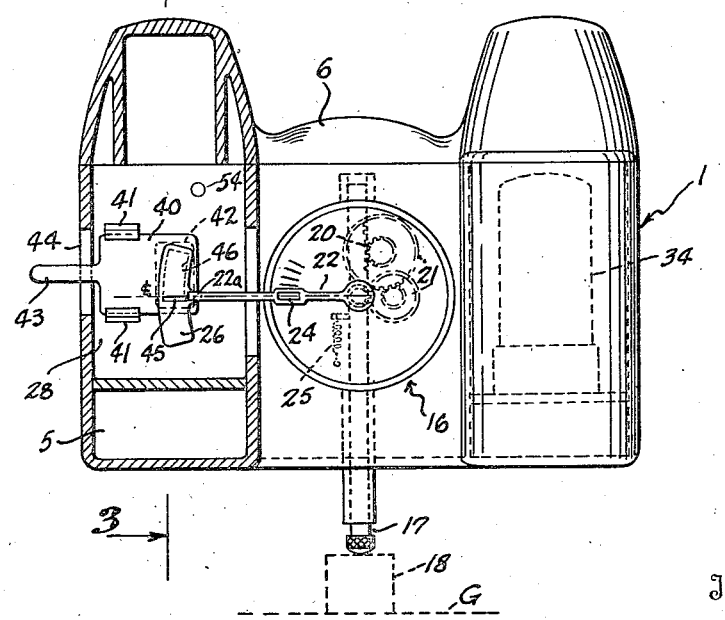
Fig. 2 is a front elevation and partial vertical section, the section being substantially on line 2—2 of Fig. 1.
Figure 3:
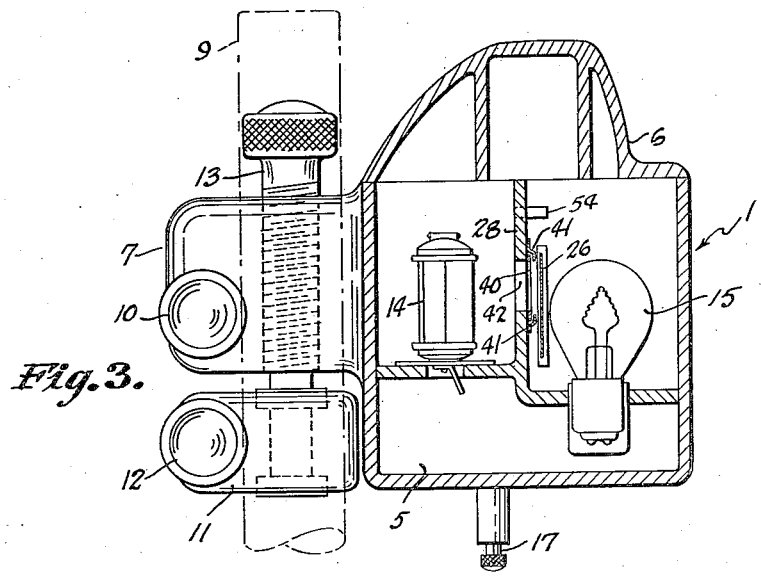
Fig. 3 is a vertical section substantially on line 3—3 of Fig. 2.
Figure 4:
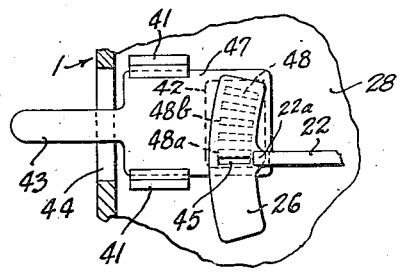
Figs. 4 and 5 are detail views showing modifications of the light control means.
Figure 5:
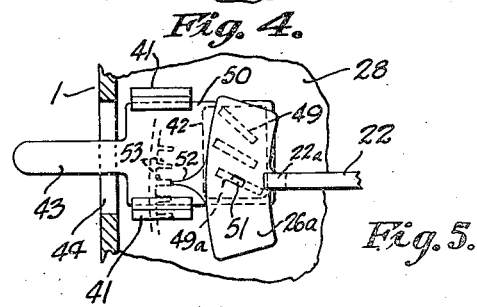

The slot or opening 46 could be made directly in the wall 28, but for a purpose presently to be described instead of being located in this fixed or permanent dividing wall it is in a separate removable slide or element 40 that is inserted between the light source 15 and the photocell element 14, and to permit passage of light through this opening or slot 46 it is in alignment with an opening 42 in the wall 28 and which opening is at least as large as the opening 46, but is preferably larger to accommodate different sized openings 46. This element 40 is in the form of a templet which is removably and adjustably mounted in the housing preferably on the dividing wall 28 and therefore is a part of the dividing wall separating the light element from the cell element. This templet may be a flat plate of metal or other opaque material of a suitable gauge or thickness, and is mounted at its opposite edges to slide in suitable guides 41 mounted on the wall 28, and which guides provide sufficient grip or friction on the templet to hold it in the desired position, but will permit removal of one templet and the insertion of another or the adjustment of a given templet to different positions, for a purpose which will later be described. This templet covers the opening 42 in the wall 28 with which any slot or slots in the templet are in alignment, but it is to be understood that if a permanent set-up is desired, the slot or slots in the templet may be in the wall 28 itself. Figs. 2, 4 and 5 not only show the beam slot or slots in the templet but show different modified arrangements with respect to the indicator arm to secure different effects. The templet may be provided with a suitable handle 43 projecting through an opening 44 in the side of the housing for removal of one templet and the insertion of another or the adjustment of the templet.

Several slides or templets having either slots of varying lengths or a plurality of slots in different arrangements can be used. The purpose of these removable or replaceable slides or templets is to permit varying the tolerances without in any way disassembling the gauge unit, and it will be evident that with these removable or replaceable slides or templets and the removable and replaceable tips for the indicator arm 22, a large number of various combinations of control slots and arrangements can be used and any one desired employed without disassembling the unit. Any combination of tolerances and grading can be accomplished by the simple expedient of cutting a templet to any combination required.

In the arrangement of Fig. 2 the removable tip 26 has a single slot 45 which may run over and in alignment with the elongated slot or opening 46 in the templet 40. These are the corresponding elements shown diagrammatically in Fig. 6.

This arrangement utilizes the principle where the light shines on the photocell element when the piece or element 19 being gauged is within the tolerances desired. The longer slot 46 in the slide or templet 40 will determine the tolerances allowed by the gauge, the length of the slot being made to give the tolerances desired. It will be noted that the width of the tip 26 on the indicating arm 22 is sufficient so that the slot 46 is covered at all times during the normal movement of the indicating arm, and prevents passage of the light beam to the photocell element except when the narrow slot 45 in the tip lines up with the slot or opening 46.

The operation of this arrangement is as follows: The indicating arm 22 should be set so that its slot 45 lines up exactly with the middle point of the slot 46 when a master part 18 of exactly the correct size desired is inserted under the stem 17 of the gauge member. If the slot 46 in the slide is wide enough so that the slot 45 in the arm still lines up with part of the opening 46 when an element 19 is being gauged that is of the smallest size acceptable, and the slot 45 also is in alignment with the slot 46 when an element 19 of the largest size acceptable is under the stem 17 of the gauge arm, it will be seen that the light beam continues to fall on the photocell element 14 under all of these conditions and a single signal is given, showing that the element being gauged is within the limits desired. If the slot 45 does not come up to the bottom of the slot 46 when a piece or element to be gauged is slid under the gauging stem, no signal will be given, showing that the part being gauged is too small. If, due to the part being too large, the slot 45 is moved past the slot 46, then two signals will result, one when the arm moves up and the other when it moves back after the element or piece being gauged is removed, showing that the piece is too large. The tolerances can be easily changed by inserting slides 40 with different length of slots depending on the tolerances permissible. Upward movement of indicator arm 22 and member 26 is limited by a stop pin 54 in the path of member 26. This arrangement involves a structure where one of the slots is movable relative to the other.

In Figs. 4 and 5 are shown two modified arrangements also in which one of the slots is movable relative to the other, but in these two latter arrangements a plurality of spaced slots are provided in one of the elements and they may be so arranged that one signal is given for every time the indicating arm moves a distance equal to one measuring unit or a multiple thereof, depending on the spacing of the slots.

Referring first to Fig. 4, the slide 47 corresponds with the slide 40 and is mounted in the same way on the wall 28. In this slide instead of one long slot there is provided a plurality of spaced narrow slots 48, there being a slot for each one of as many measuring units as may be desired and preferably spaced a distance corresponding to the movement of the tip 26 and slot 45 for a difference of one measuring unit in the element being gauged. The cooperating measuring arm 22 has the same tip 26 as in the arrangement of Fig. 2, provided with a single slot 45 adapted to pass over and in alignment with the plurality of slots 48. This arrangement permits of determining how many actual measuring units a part being gauged varies from any given size. For example, if the device is so set that the slot 45 in the measuring arm lines up exactly with the lowest slot 48a in the slide 47 when a master part 18 that is one measuring unit over the basic desired size is placed under the measuring stem 17, then one signal will be given for every measuring unit that a part being gauged is over the basic size.

Thus if a part 19 is placed under the gauge stem that is three measuring units over the basic size, the arm 22 and the tip 26a will move upwardly to carry the slot 45 over the two lower slots 48 and into alignment with the third slot 48b, but in moving to this position three signals, one for each slot, will be given. Therefore, by counting these signals, the operator will know the number of measuring units the part being gauged is over the desired basic size.

The same principle and operation is involved in the arrangement in Fig. 5, but this shows an arrangement where micro-adjustment of the lining up of the slots in the indicating arm and the slide can be readily made. Thus the plurality of spaced slots 49 in the slide 50 corresponding to the slots 48 of Fig. 4 are inclined to the path of movement of the slot 51 in the tip 26a of the indicator arm 22. This device may be set the same as described in connection with Fig. 4, and each signal given as the slot 51 passes over a slot 49 indicates a difference of one measuring unit of the part being gauged over the basic size of master part 18. However, because the slots are inclined to the path of movement, if for example the slot 51 in the indicating arm and the lower slot 49a in the slide 50 do not quite line up when the master part 18 is under the gauging stem, sliding the slide 50 slightly in or out will line the slots up perfectly because of the angle on which the slots in the slide 50 and the indicating arm tip 26a are placed. This feature is also valuable where slot alignment may change due to room temperature variation. This feature is also valuable if it is desired to also incorporate a visual indicator on the indicating arm, as shown at 52. By moving the slide 50 in or out slightly this visual pointer 52 could be made to line up exactly with calibration marks 53 on a dial face.

It should be noted that when the slides are used for the type of Figs. 4 and 5 for counting measuring units, the number of signals given must be noted before the part 19 being gauged is removed from under the gauging stem 17, as contrasted with the arrangement previously described where no signal signifies too small a part, one signal the correct size, and two signals oversize. In these arrangements the signals are noted from the time the piece being gauged is placed under the gauging stem and until it is removed therefrom.

It will also be understood that in these arrangements the electrical changes in the electric circuit of the photocell due to light interruption can be utilized in any one of the combination of results described in connection with the other arrangements. These arrangements of Figs. 4 and 5, however, can be utilized for counting and translating into any type of signal and operation the actual number of measuring units the part being gauged may vary from some basic desired size. For example, they could be employed to operate sorting apparatus in which all the parts gauged which vary from the basic size any given number of measuring units, as one, two or three units, for example, are all placed in the same receptacle, those varying only one unit from the basic size being deposited in one receptacle, those varying two units in another receptacle, and so on.

It is to be understood the signal 33 is shown merely by way of example, but that the varying resistance of the photocell element due to the light beam being interrupted can be utilized for any purpose desired. Thus for example it may be used when properly connected through suitable amplifiers to produce any type of signal, such as audio, visual, and so forth, or may be used to translate the interruption of the light beam through suitable amplifiers and associated electrical circuits, relays and electrically actuated mechanical means to do any type of sorting, rejection of parts being gauged or controlling of associated machinery in manufacturing said parts.

Figs. 1 to 6 show the device specifically employed for gauging round and similar articles, but it is to be understood it is not limited to such uses, but may be employed in a large number of different applications. For example, in addition to gauging the sizes or dimensions of various articles and indicating these sizes, it may be used for controlling a device for sorting the articles according to size, as described in my copending applications filed March 15, 1943, Serial Nos. 479,241 and 479,242, and designated Cases D and E; or by using any other type of standard counting or sorting equipment that operates on signal impulses; or it may be used to control various devices as machine tools and the like to adjust metal working operations to maintain the parts within certain size limits, or it may be used to automatically measure and control size variations, temperature variations, pressure variations and the like or minute nature, and to do it very accurately. A few examples of these different applications are illustrated in Figs. 8 to 12 in my copending application Serial No. 479,239, filed March 15, 1943, and designated Case A, these examples not being illustrated herein to avoid duplication and simplify the disclosure.

Having thus set forth the nature of my invention, what I claim is:

1. A gauging device comprising a photocell element, means for connecting said element with a device to be controlled, a light element positioned to provide a light beam to the cell element, a wall between the light and the cell provided with an opening for passage of the light beam, a shutter, means for adjustably mounting the shutter on the wall over said opening, said shutter being provided with a slot in alignment with the wall opening and inclined to the direction of movement of the shutter in adjusting it, a movable member including a portion movable over the slot and provided with an opening adapted to be brought into alignment with the slot, a gauging stem adapted to engage an element to be gauged, and an operative connection from the stem to the member.

2. A gauging device comprising a photocell element, means for connecting said element with a device to be controlled, a light element positioned to provide a light beam to the cell element, a wall between the light and the cell provided with an opening for passage of the light, a shutter adjustably mounted on the wall provided with a series of spaced slots in alignment with the wall opening and inclined to the direction of movement of the shutter while it is being adjusted, a movable member including a portion movable over said slots and provided with an opening adapted to be aligned with the different slots, a gauging stem adapted to engage an article being gauged, and an operative connection from said stem to the member.

3. A gauging device comprising a housing, a photocell element mounted in the housing, means for connecting said element with an indicating means to be controlled thereby, a light element in the housing to provide a light beam to the cell element, a wall between the light element and the cell element provided with a slot for the light beam, a mechanical gauging element in the housing including a movable member positioned to be affected by the element to be gauged, and a movable member operated by the first member located between the light element and the cell element and provided with a slot of less width than the first slot adapted to move into alignment with the first slot, said second movable member being of a width to cover the first slot and interrupt the light beam except when the slots are in alignment.

4. A gauging device comprising a photocell element, means for connecting said element with a device to be controlled, a light element positioned to provide a light beam to the cell element, a wall member between the light and the cell provided with a slot for passage of the light beam, a movable member including a portion movable over said slot and provided with a slot adapted to be brought into alignment with the first slot, said portion being of a width to cover said first slot to interrupt the light beam except when the slots are in alignment, a second movable member in position to be affected by the element being gauged, an operative connection from said second member to the first member, and said first slot being wider than the second slot and of a width equal to movement of the second slot corresponding to a variation of a plurality of measuring units in the element being gauged.

5. A gauging device comprising a housing, a photocell element mounted in the housing, means for connecting said element with a device to be controlled, a light element in the housing to provide a light beam to the cell element, a wall between the light and the cell provided with an opening, a templet, means for so mounting the templet on the wall over said opening that it is readily removable for interchangeability with other templates, said templet being provided with at least one slot in alignment with the wall opening for passage of the light beam, a mechanical gauging element in the housing including a movable member positioned to be affected by the element being gauged, an arm connected with the first member for operation thereby, a member carried wholly by said arm between the light element and the cell element and movable across the slot to control the light beam, and means for removably mounting said latter member on the arm so that members having different characteristics may be mounted on the arm to cooperate with the templet to control the beam.

6. A gauging device comprising a photocell element, means for connecting said element with a device to be controlled, a light element positioned to provide a light beam to the cell element, a stationary shutter between the light and the cell, a second shutter movable over the first shutter, one of said shutters being provided with an opening and the other provided with a series of spaced slots adapted for alignment with the opening by movement of the second shutter, means for mounting the shutter with the slots for adjustment relative to the other shutter and said slots being inclined to the direction of adjustment, a movable member positioned to be affected by the element being gauged, and an operative connection from said member to the movable shutter to cause relative movement between the opening and the slots to control the light beam.

7. A gauging device comprising a housing, means for mounting the housing on an application locating support, a photocell element in the housing, means for connecting said element with a means to be controlled, a light element in the housing to provide a light beam to the cell element, a templet between the light element and the cell element and provided with a plurality of laterally spaced slots for passage of the light beam, a mechanical gauging element in the housing including a movable member positioned to be affected by the element being gauged, a second movable member connected with said first member for operation thereby, a portion of said second member being movable over the slots and provided with an opening adapted to be brought into alignment therewith, said portion being of a width to cover the slots except when the opening is in alignment therewith, guide means mounting the templet for adjustment relative to said opening, and said slots being inclined to the direction of movement of the templet while being adjusted.

8. A gauging device comprising a housing, a locating support for locating and supporting an element to be gauged, means associated with said support for mounting the housing for adjustment relative to the support, a photocell element mounted in the housing, means for connecting said element with an indicating means to be controlled thereby, a light element in the housing to provide a light beam to the cell element, a wall between the light element and the cell element including a section provided with a slot for passage of the light beam, means for so mounting the wall section that it is readily removable for interchangeability with other sections having a different arrangement of slot, means for removing said section from and replacing it in the mounting means, a mechanical gauging element in the housing including a movable member positioned to be affected by the element to be gauged, and a movable member operated by the first member located between the light element and the cell element and adapted to cooperate with the slots of said sections to control the light beam to the cell.

9. A gauging device comprising a photocell element, means for connecting said element with a device to be controlled, a light element positioned to provide a light beam to the cell element, a wall between the light and the cell provided with an opening, a shutter, means on the wall for so mounting the shutter over said opening that it is readily removable for interchangeability with other different shutters, means for removing the shutter from and replacing it in said mounting means, said shutter being provided with at least one opening in alignment with the opening in the wall for passage of the light beam, an arm including a head movable over the shutter opening to control the light beam, a gauging stem adapted to engage an element to be gauged, and an operative connection from the stem to the arm.

10. A gauging device comprising a housing, a photocell element mounted in the housing, means for connecting said element with a device to be controlled, a light element in the housing to provide a light beam to the cell element, a wall between the light and the cell provided with an opening, a templet, means for so mounting the templet on the wall over the opening that it is readily removable for interchangeability with other different templets, means for removing the templet from and replacing it in the mounting means, said templet being provided with at least one slot in alignment with the wall opening for passage of the light beam, a mechanical gauging element in the housing including a movable member positioned to be affected by the element being gauged, an arm connected with the first member for operation thereby, a member carried wholly by said arm between the light element and the cell element and provided with a slot movable into alignment with the first slot, said latter member being of a width to cover the first slot except when the slots are in alignment, and means for removably mounting the latter member on the arm for ready interchangeability with other similar members.

EUGENE F. MARTINEC.